United States Patent [19]

Phillips et al.

[11] Patent Number: 5,039,230

[45] Date of Patent: Aug. 13, 1991

[54] ROLLER BEARING

[76] Inventors: James R. Phillips; George Spector, both of 233 Broadway, RM 3615, New York, N.Y. 10007

[21] Appl. No.: 594,369

[22] Filed: Mar. 28, 1984

[51] Int. Cl.$^5$ .............................................. F16C 43/04
[52] U.S. Cl. .................... 384/560; 384/484; 384/499; 384/523; 384/574
[58] Field of Search ............ 308/187.1, 189 R, 207 R, 308/201, 217, 196, 188, 202, 216; 384/477, 484, 490, 499, 501, 502, 523, 524, 526, 539, 548, 552, 560, 570, 572, 574, 577, 584, 585

[56] References Cited

U.S. PATENT DOCUMENTS

| 1,346,147 | 7/1920 | Webster | 308/217 X |
|---|---|---|---|
| 1,544,176 | 6/1925 | Peterson | 384/502 |
| 1,644,611 | 10/1927 | Rieffert | 308/196 |
| 2,209,578 | 7/1940 | Rainey et al. | 277/216 X |
| 2,528,987 | 11/1950 | Ablett | 308/216 |
| 2,659,636 | 11/1953 | Wheelis | 308/196 X |
| 2,861,849 | 11/1958 | Case | 308/201 |
| 3,546,762 | 12/1970 | Martin | 384/503 X |
| 3,557,420 | 1/1971 | Matt et al. | 308/187.1 X |
| 3,592,519 | 7/1971 | Martin | 384/503 |
| 3,826,545 | 7/1974 | McKee | 384/493 |

Primary Examiner—John M. Jillions

[57] ABSTRACT

A two piece split bearing assembly is provided and consists of an outer race ring, an inner race ring and a plurality of antifriction elements all split in half. A male V-groove is formed on each end of one half of the outer race ring and the inner race ring while a female V-groove is formed on each end of other half of the outer race ring and inner race ring. When the two halves of the inner race ring and outer race ring are mated together with the antifriction elements between they will form the bearing assembly.

1 Claim, 1 Drawing Sheet

ROLLER BEARING

BACKGROUND OF THE INVENTION

The instant invention relates generally to bearings and more specifically it relates to a two piece split bearing assembly.

To remove old worn bearings shaft stripping must be done before new bearings can be replaced onto a shaft. This situation is time consuming so accordingly it is in need of an improvement.

Numerous bearings have been provided in prior art that are adapted to take thrust and radial load. For example, U.S. Pat. Nos. 3,546,762; 3,592,519 and 3,826,545 all are illustrative of such prior art. While these units may be suitable for the particular purpose to which they address, they would not be suitable for the purposes of the present invention as heretofore described.

SUMMARY OF THE INVENTION

A principle object of the present invention is to provide a two piece split bearing assembly that will allow positive machine fit without need of shims.

Another object is to provide a two piece split bearing assembly that will eliminate all shaft stripping when removing old worn bearings thus cutting down repair time in half.

An additional object is to provide a two piece split bearing assembly that can utilize either balls or rollers with a flexible retainer bracket.

A further object is to provide a two piece split bearing assembly that is simple and easy to use.

A still further object is to provide a two piece split bearing assembly that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
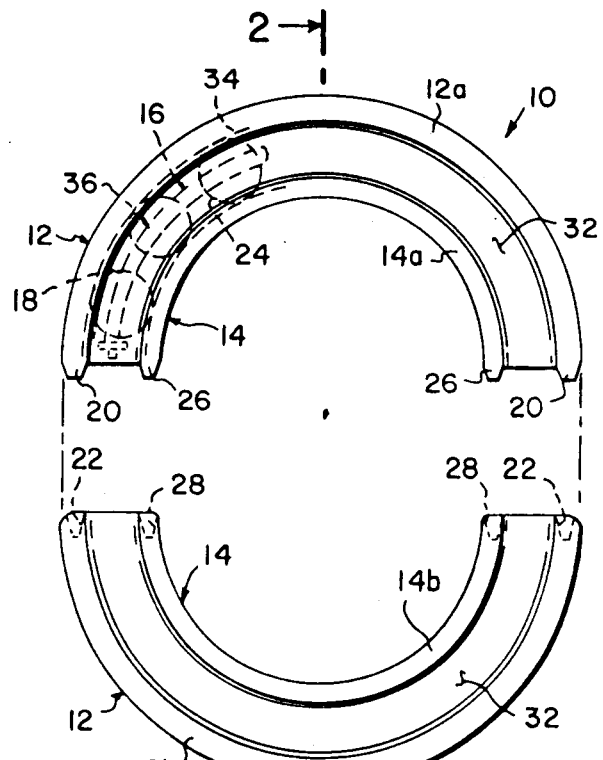
FIG. 1 is an exploded side elevational view of the invention.
Figure 2:
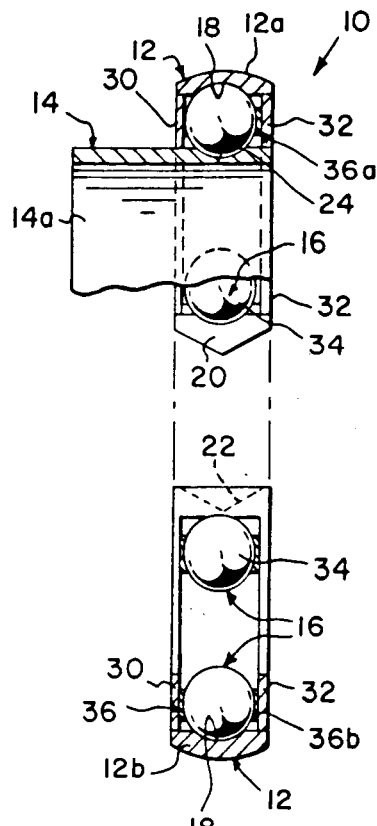
FIG. 2 is a cross sectional view taken along line 2—2 in FIG. 1 with parts broken away.

Turning now descriptively to the drawings, in which similar reference characters denote similar elements throughout the several views, FIGS. 1 and 2 illustrates a two piece split bearing assembly 10. The assembly 10 consists of an outer race ring 12, a inner race ring 14 and a plurality of antifriction elements 16. The outer race ring 12 has an internal annular raceway 18. The outer race ring 12 is split in half. One half 12a has a V-shaped projection 20 on each end while the other half 12b has a female V-groove 22 on each end.

The inner race ring 14 has an internal annular raceway 24 about its perimeter. The inner race ring 14 is split in half. One half 14a has a V-shaped projection 26 on each end while the other half 14b has a female V-groove 28 on each end.

The antifriction elements 16 are split in half. Each half is mounted between one half of the inner race ring 14 and the outer race ring 12 so that when the two halves of the inner race ring 14 and the outer race ring 12 are mated together they will form the bearing assembly 10.

A pair of oil seal rings 30 and 32 are provided. Each oil seal ring 30 and 32 is split in half with each half placed between one half of the inner race ring 14 and the outer race ring 12 adjacent the antifriction elements 16. When the two halves of the inner race ring 14 and the outer race ring 12 are mated together the oil seal rings 30 and 32 will retain oil (not shown) within the bearing assembly 10.

Figures 3, 4, 5:
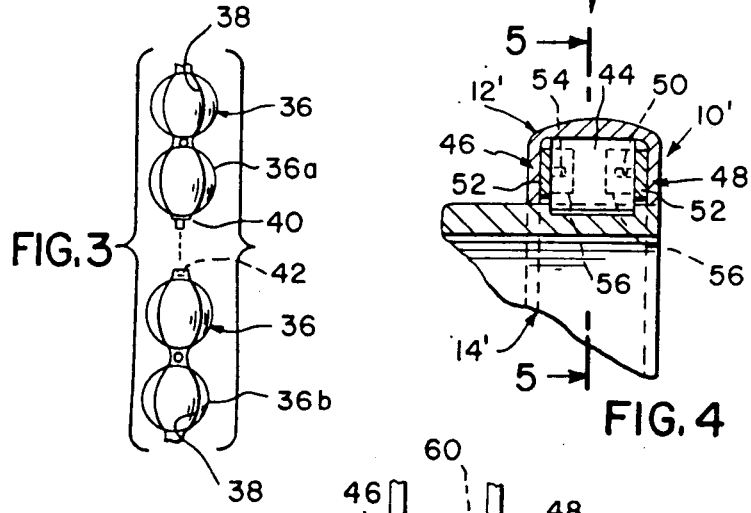
FIG. 3 is a partially exploded top view of the retainer bracket.
FIG. 4 is a partial cross sectional view of a modified form of the invention using roller bearings.
FIG. 5 is a cross sectional view taken along line 5—5 in FIG. 4.

The antifriction elements 16 consists of a plurality of balls 34 and a flexible retainer bracket 36. As best seen in FIG. 3, the retainer bracket 36 has a plurality of apertures 38 to engage the balls 34. The retainer bracket 36 is split in half. One half 36a has a male pin 40 on each end while the other half 36b has a female aperture 42 on each end whereby the two halves 36a and 36b of the retainer bracket 36 are mated together.

Figure 6:
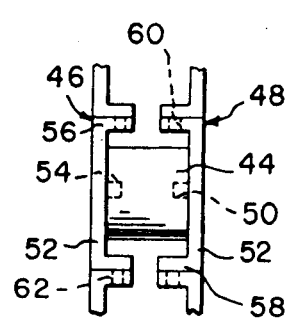
FIG. 6 is a top view of the segments 52 with rollers 44 mounted therein.

FIGS. 4-6 shows a modified form of a two piece split bearing assembly 10' that contains a plurality of rollers 44 and a pair of flexible retainer brackets 46 and 48.

Each roller 44 has an aperture 50 at each side. Each bracket 46 and 48 contains a plurality of segments 52. Each segment 52 has similar center pins 54 extending inward of the brackets to engage apertures 50 of rollers 44. The segments have a pair of transverse flanges 56 and 58 at each end. One of each said pair of flanges has a female aperture 60 and the other of each said pair of flanges has a pin 62. Each male pin 62 engages a respective female aperture 60 at adjacent flanges thus forming the segmented brackets 46 and 48.

Each male pin 62 snugly snap fits into each adjacent aperture 60 to provide a series of connections to form said segmented brackets.

The inner race ring 14 shown in FIG. 2 is wider than the outer race ring 12 and the inner race ring 14' shown in FIG. 4, is wider than the outer race ring 12' so that the inner race ring 14 and 14' can fit over a greater circumference of a shaft (not shown).

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A two piece split bearing assembly which comprises:

a) an outer race ring having an internal annular raceway, said outer race ring split in half, one half having a V-shaped projection on each end while the other half having a female V-groove on each end;

b) an inner race ring having an annular raceway about its perimeter said inner race ring split in half, one half having a V-shaped projection on each end while the other half having a female V-groove on each end; and c) a plurality of antifriction elements separated in two halves, with each half mounted between one half of said inner race ring and said outer race ring so that when the two halves of said inner race ring and said outer race ring are mated together they will form said bearing assembly further comprising a pair of oil seal rings, each said oil seal ring is split in half with each half placed between one half of said inner race ring and said outer race ring adjacent said antifriction elements so that when the two halves of said inner race ring and said outer race ring are mated together said oil seal rings will retain oil within said bearing assembly;

d) said antifriction elements comprise a plurality of rollers each having opposite sides within said assembly, each roller having a transverse aperture at each side; and e) a connected linkage of flexible retainer brackets each enclosing the sides of said rollers, each bracket containing a plurality of segments adjacent the sides of said rollers, each segment having opposing center pins extending inward of said assembly towards said rollers to engage each said aperture of each roller, each said segment having transverse flanges at each end, one of said flanges having a female aperture and the other of said flanges having a male pin whereby each male pin of said flanges engages a female aperture of an adjacent successive flange thus forming each said bracket.

* * * * *